(12) United States Patent
Duran

(10) Patent No.: US 6,280,620 B1
(45) Date of Patent: Aug. 28, 2001

(54) OIL FILTER TIGHTENING AND REMOVAL SYSTEM

(76) Inventor: L. David Duran, 3412 S. Champlain Ave., Tucson, AZ (US) 85730

( * ) Notice: Subject to any disclaimer, the term of this patent is extended or adjusted under 35 U.S.C. 154(b) by 0 days.

(21) Appl. No.: 09/434,672

(22) Filed: Nov. 5, 1999

(51) Int. Cl.[7] .................................................. B01D 27/08
(52) U.S. Cl. ......................... 210/238; 210/443; 210/470; 210/DIG. 17; 81/176.15; 81/461
(58) Field of Search .................................... 210/238, 440, 210/443, 444, DIG. 17, 470; 81/176.1, 176.2, 176.15, 177.3, 177.5, 460, 461

(56) References Cited

U.S. PATENT DOCUMENTS

| D. 264,614 | 5/1982 | Johnson, Sr. | D23/4 |
|---|---|---|---|
| 4,266,452 | 5/1981 | Crist | 81/121 R |
| 4,364,829 | 12/1982 | Atkins et al. | 210/238 |
| 5,000,847 | 3/1991 | Huang | 210/238 |
| 5,024,760 | 6/1991 | Kemper | 210/232 |
| 5,328,606 | * 7/1994 | Warren et al. | 210/239 |
| 5,744,032 | 4/1998 | Kemper | 210/238 |

FOREIGN PATENT DOCUMENTS

1532437 * 6/1968 (FR) .............................. 210/DIG. 17

* cited by examiner

Primary Examiner—Matthew O. Savage
(74) Attorney, Agent, or Firm—Rudolf O. Siegesmund

(57) ABSTRACT

An oil filter body with two protruding tabs positioned to rest flush with the top edge of the oil filter. The key is a plastic unit designed to fit over the top of the oil filter and the key has two male posts which correspond to and fit into the filter's protruding female tabs. The key has a handle-like grip providing the user with a secure and comfortable grasp on the tool.

4 Claims, 1 Drawing Sheet

OIL FILTER TIGHTENING AND REMOVAL SYSTEM

BACKGROUND OF THE INVENTION

1. Field of the Invention

The present invention relates to devices for inserting, tightening and removing oil filters from internal combustion engines with oil filters.

2. Description of the Prior Art

Replacement of an oil filter is an integral part of the proper maintenance on all motor vehicle, boat and private aircraft engines. Current oil filters require the use of a separate oil filter removal tool such as a strap type metal wrench, or a socket wrench which can be inserted into a socket wrench may be required. The use of such tools becomes more and more difficult as more and more equipment is inserted into the engine compartment of automotive vehicle, boat and private aircraft engine compartments.

The prior art discloses designs for oil filter canisters intended to facilitate installation and removal. U.S. Pat. No. 5,744,032 to Kemper discloses a molded attachment with fins which can be molded into the canister itself or sold as separate attachment. U.S. Pat. No. 5,024,760 to Kemper also discloses fins attached to the oil filter. U.S. Pat. No. 5,00,847 to Huang discloses an oil filter body with several types of fixtures attached to the top of the canister including a straight handle, a graspable hollow handle and a rectangular cam. U.S. Pat. No. 4,364,829 to Atkins discloses a cylinder into which the oil filter is placed wherein the cylinder will accept two handles for turning the cylinder and where one handle is fixed and the other handle has folding components. The cylinder of the 829 disclosure also accepts a standard socket wrench for turning the cylinder. U.S. Pat. No. 4,266,452 discloses a cylindrical cap with two intersecting grooves for accepting a bar which can be used to turn the cylindrical cap.

What is needed beyond the prior art is a design modification to the body of an oil filter which would allow easy installation and removal using a standard key tool for turning the oil filter.

SUMMARY OF THE INVENTION

The present invention meets the needs identified above by providing an oil filter body with two protruding female tabs positioned to rest flush with the top edge of the oil filter. A plastic key unit designed to fit over the top of the oil filter has two male posts which correspond to and are capable of fitting into the filter's protruding female tabs. The key has a handle-like grip providing the user with a secure and comfortable grasp on the tool.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figures 1, 2:
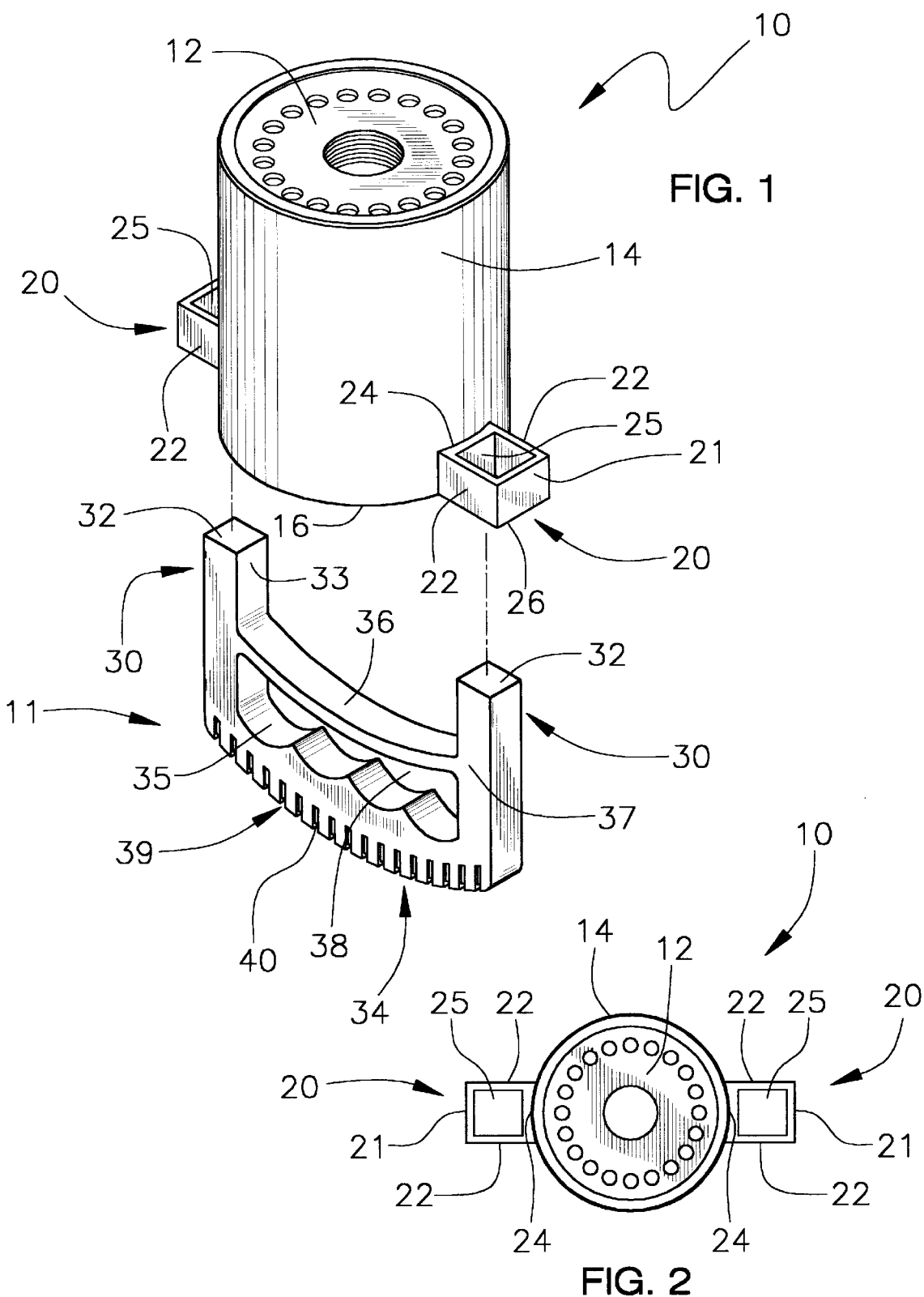
FIG. 1 is a perspective view of the oil filter with tabs and the key with posts.
FIG. 2 is a bottom view of the oil filter showing the tabs protruding from the sides.

In FIG. 1, oil filter 10 is shown with bottom 12 exposed. Bottom 12 is the portion of the oil filter to be inserted into the internal combustion engine. Oil filter 10 has casing 14 with protruding tabs 20. In the preferred embodiment two tabs 20 are fixedly engaged to casing 14. Tabs 20 can be affixed permanently to casing 14 by forming casing 14 and tabs 20 in one piece. Alternatively, persons skilled in the art will be familiar with a variety of ways to fixedly engage tabs 20 to casing 14 including glue, solder and welding. Tabs 20 are positioned opposite each other on casing 14 and are aligned so that top 16 of oil filter 10 and tab tops 26 of tabs 20 are in the same plane. Tabs 20 have outer wall 21, side walls 22 and cylinder interface 24. Side walls 22, outer wall 21 and cylinder interface 24 are fixedly connected to each other and together define interior space 25. Persons skilled in the art will be aware that any number of shapes could be utilized for interior space 25 such as circles, triangles, squares, pentagons, hexagons and octagons. Thus, interior space 25 could have any number of sides. Casing 14 and tabs 20 may be made from metal, plastic or any material with suitable durability, strength and resistance to heat and chemicals.

Key 11 is shown in FIG. 1. Key 11 has two posts 30 on each side of key 11. Posts 30 are connected by bridge 36 and handle 34. Handle 34 has face 37 and an identical face 37 on the other side of handle 34 (not shown). Handle 34 has finger grooves 35 for providing a firm grip. Grip space 38 is defined by bridge 36, posts 30 and handle 34 and can accept the fingers of a human hand while the palm of the human hand will rest on and contact a series of serrations 40 on handle top 39. Posts 30 have interior walls 33 which join bridge 36. Post tops 32 are rectangular in shape and are just slightly smaller than interior space 25 of tabs 20. Persons skilled in the art will be aware that any number of shapes could be utilized for post top 32 such as a circle, triangle, square, pentagon, hexagon, octagon and so on. Post 30 could have any number of sides corresponding to the shape of post top 32. The shape of post 30 and post top 32 would conform to the shape of interior space 25 while being slightly smaller to allow passage of post 32 into interior space 25 of tab 20. Key 11 can be made from metal, plastic or any material with suitable durability, strength and resistance to heat and chemicals.

FIG. 2 shows oil filter 12 seen directly from bottom 12. Tabs 20 are shown directly opposite each other rigidly affixed to canister 14 of oil filter 10. Interior spaces 25 are shown for receiving posts 30 of key 11 (See FIG. 1). Tabs 20 have outer wall 21, side walls 22 and cylinder interface 24. Side walls 22, outer wall 21 and cylinder interface 24 define interior space 25. Persons skilled in the art will be aware that any number of shapes could be utilized for interior space 25 such as circles, triangles, squares, pentagons, hexagons, octagons and so on. Interior space 25 could have any number of sides.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A combination oil filter and key comprising:

an oil filter having a casing and a top that both surround a vertical axis;

at least two tabs rigidly affixed to said casing, each of said tabs having a hole and a tab top, wherein each of said holes surround respective axes that are generally parallel to said vertical axis;

a key having a handle with at least two posts that are generally parallel to one another and adapted to be received within a respective one of said holes, said handle including a plurality of serrations on a top thereof and a plurality of finger grooves on a bottom thereof, a bridge spaced apart from said handle, wherein said posts are connected together by said bridge and said handle, said handle having a grip space bounded by said bridge and said posts and said handle so that said grip space is adapted to accept the fingers of a human hand and is further adapted so that the palm of the human hand can rest on and contact a plurality of serrations on the handle top; and wherein said tabs are positioned opposite each other on said casing and said tabs are aligned so that said top of the casing and each of said tab tops are in the same plane.

2. The combination of claim 1, wherein each of said tabs includes a wall defining a cylinder interface with said casing, a radially outer wall, and at least two side walls that are generally parallel to one another and that interconnect the wall defining the cylinder interface and the radially outer wall, wherein said side walls, said outer wall and said cylinder interface are fixedly connected to each other and define an interior space for receiving a respective post.

3. An apparatus for rotating a cylinder having at least two tabs comprising a key having a handle, at least two posts; wherein each of said posts are generally parallel to one another and are sized to mate with a respective one of said tabs, a bridge spaced apart from said handle, wherein said posts are connected by said bridge and a said handle, said handle having a first face, a second face, a handle top, finger grooves on a bottom thereof, and a grip space bounded by said bridge and said posts and said handle so that said grip space is adapted to accept the fingers of a human hand and is further adapted so that the palm of the human hand can rest on and contact a plurality of serrations on said handle top.

4. An apparatus comprising:

an oil filter casing and a top that both surround a vertical axis;

at least two tabs rigidly affixed to said casing, each of said tabs having a hole and a tab top, a wall defining a cylinder interface with said casing, a radially outer wall and at least two side walls that interconnect the wall defining the cylinder interface and the radially outer wall, wherein said holes surround respective axes that are generally parallel to said vertical axis;

a key having a handle with at least two posts, said handle including a plurality of serrations in a top thereof and a plurality of finger grooves in a bottom thereof;

wherein said tabs are positioned opposite each other on said casing and said tabs are aligned so that said top of the casing and each of said tab tops are in the same plane;

wherein said side walls, said outer wall and said cylinder interface are fixedly connected to each other and together define an interior space for receiving a respective one of said posts; and a bridge spaced apart from said handle, wherein said posts are connected by said bridge and said handle, said handle having a grip space bounded by said bridge, and said posts and said handle so that said grip space is adapted to accept the fingers of a human hand and is further adapted so that the palm of the human hand can rest on and contact a plurality of serrations on said handle top.

\* \* \* \* \*